United States Patent [19]

Robinson et al.

[11] Patent Number: 4,935,951
[45] Date of Patent: Jun. 19, 1990

[54] EMERGENCY TELEPHONE ACTUATED SIGNAL LIGHT OR THE LIKE DEVICE AND METHOD

[75] Inventors: Gary J. Robinson, New Britain; Walter V. Ciecierski, Branford, both of Conn.

[73] Assignee: Ek-Ris Enterprises, Inc., New Britain, Conn.

[21] Appl. No.: 441,660

[22] Filed: Nov. 27, 1989

[51] Int. Cl.⁵ .................................. H04M 11/04
[52] U.S. Cl. .................................. 379/37; 379/386; 379/396; 340/332
[58] Field of Search ........................ 379/36–38, 379/40, 45, 49, 51, 104, 105, 188, 199, 200, 354, 386, 396; 340/331, 332

[56] References Cited

U.S. PATENT DOCUMENTS

| | | |
|---|---|---|
| 1,298,293 | 3/1919 | Clausen . |
| 2,298,488 | 10/1942 | Kiner et al. ........................ 379/37 |
| 3,798,375 | 3/1974 | Delisle ............................. 379/40 |
| 3,860,762 | 1/1975 | Klaiber et al. ................. 379/200 X |
| 3,913,092 | 10/1975 | Klingenberg ................ 340/331 X |
| 4,003,040 | 1/1977 | Browand ........................ 340/332 |
| 4,303,801 | 12/1981 | Anderson et al. . |
| 4,425,480 | 1/1984 | Lischin ........................... 379/200 |
| 4,547,761 | 10/1985 | Jones ............................. 340/331 |
| 4,570,155 | 2/1986 | Skarman et al. ............. 340/331 X |
| 4,791,658 | 12/1988 | Simon et al. .................. 379/104 X |
| 4,866,762 | 9/1989 | Pintar ............................. 379/200 |
| 4,878,236 | 10/1989 | Ray et al. ........................ 379/37 |

OTHER PUBLICATIONS

"The Hasten 500–911", Owners Manual, Hasten Systems ©1987.

*Primary Examiner*—Keith E. George

[57] ABSTRACT

An emergency telephone call actuated light signal is visible externally of the building includes a telephone line monitor and a microcontroller for comparing the dialed numbers with a stored emergency number. If the microcontroller detects a match, it emits an actuation signal which causes operation of a light signal visible on the exterior of the building. The microcontroller includes logic for discriminating between a stored emergency number containing a series of digits and a dialed number containing the stored number sequence as a part of greater series of digits.

9 Claims, 2 Drawing Sheets

EMERGENCY TELEPHONE ACTUATED SIGNAL LIGHT OR THE LIKE DEVICE AND METHOD

BACKGROUND OF THE INVENTION

The present invention relates to an emergency signal light system for a residence or the like actuated by the dialing of an emergency telephone number.

Various communities are adopting emergency telephone numbers with limited digits which will permit the caller to seek assistance from police, fire, health and other emergency services. In some instances, the communication to the emergency telephone number may be the result of an automatic signal, such as for medical alert devices, fire detectors and the like.

Emergency vehicles responding to an emergency telephone call frequently have difficulty in locating the premises from which the call has been made in multi-unit dwellings, and in streets where there are single family homes but the numbers are not readily discernible.

It has heretofore been proposed that a dedicated emergency calling device be coupled to a light unit which would be placed in the window and signal the location from which the call is made. This light unit is actuated by use of the calling device.

It is an object of the present invention to provide a novel emergency signal light system which is actuated by calling an emergency number on a standard telephone.

It is also an object to provide such a system which is readily coupled to a telephone system and which primarily utilizes standard components which can be assembled readily and relatively economically.

Another object is to provide such an emergency light system which discriminates among numeric sequences and responds only to the emergency number or other numbers which are programmed into its memory.

SUMMARY OF THE INVENTION

It has now been found that the foregoing and related objects may be readily attained in an emergency signal light system which is actuated by dialing of an emergency telephone number and is visible externally of the building in which installed. The system includes means for detecting the numbers being dialed on a standard telephone line, and microcontroller means for comparing the detected numbers with a stored number and emitting an actuation signal upon detection of a match. Light signal means visible from the exterior of the building is actuated by an actuation signal from the microcontroller means.

Preferably, the light signal means is a flasher which is portable for placement in a window. The light signal means is adapted to be connected to battery power supply, and it includes a switch actuatable by the actuation signal.

Desirably, the microcontroller means includes logic for discriminating between a stored emergency number comprising a series of digits and a dialed number containing the stored number sequence as a part of a greater series of digits. The detecting means and microcontroller of the system are actuated by removal of the associated telephone receiver from the associated base.

In the method for generating an emergency light signal visible externally of a building, a light is placed at a location on the building visible externally to the street, and a supply of power is provided to operate the light. The telephone line is monitored to determine if a number is being dialed and the number being dialed, and the number being dialed is compared with a predetermined emergency number. An actuation signal is emitted when the dialed number matches the emergency number, and it causes power to be provided to the light from the battery to effect its illumination.

DETAILED DESCRIPTION OF PREFERRED EMBODIMENT OF THE INVENTION

Figure 1:
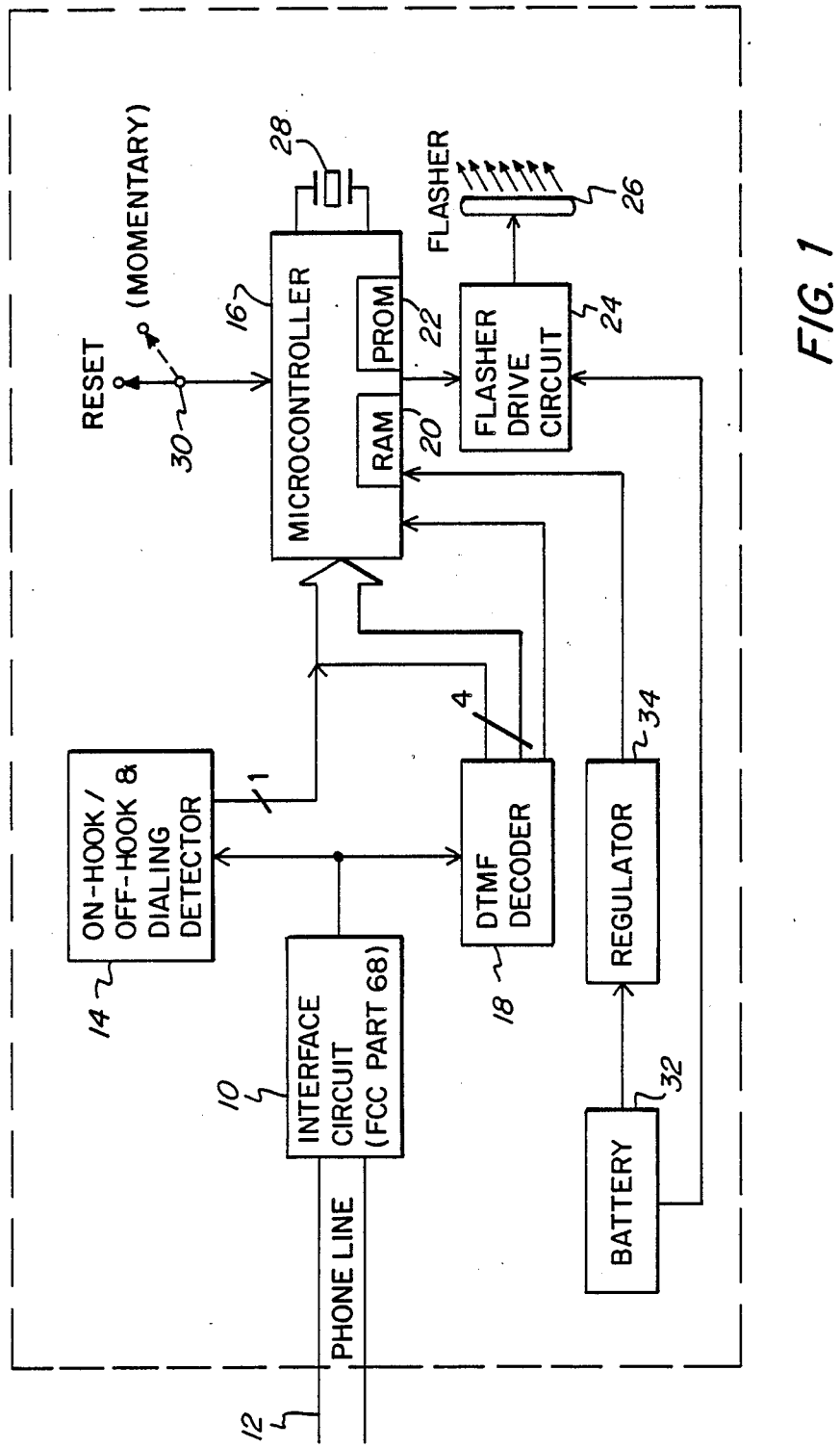
FIG. 1 is a schematic illustration of the components of an emergency telephone actuated signal light device embodying the present invention.

Turning first to FIG. 1, a telephone monitoring device for actuating an emergency signal light visible from the exterior of the house or the building includes an interface circuit component which is coupled to a standard phone line indicated by the numeral 12. The component 10 provides its sensed output to an "on" hook/"off" hook detector 14 which senses when the telephone line 12 being monitored has a receiver (not shown) off the hook, i.e., removed from its base. Upon receipt of an "off" hook condition signal, the detector 14 then actuates the microcontroller generally designated by the numeral 16 to initiate its operation. As numbers are being dialed by the user on the handset (not shown), the interface circuit component 10 passes the signals to the dual tone multifunction decoder 18 which converts the tones of a dual tone multifrequency telephone to digits, and it transmits the information to the microcontroller 16. The dialing detector 14 indicates to the microcontroller 16 the periods when dial pulse signals are being received and when they are not, so that the interval between digital dial pulse information may be considered by the microcontroller 16 to determine signals relating to a single digit, and to intervals between digits. The microcontroller 16 is thus able to count the pulses representing digits on a dial type phone to determine the digits being dialed on the dial type phone.

The microcontroller 16 has a random access memory (RAM) 20 which stores information concerning the digits being dialed on the telephone line 12 and a programmable read only memory (PROM) 22 containing the program instructions for monitoring the digits being dialed and comparing them with predetermined information, and for providing an output or actuation signal when a match is obtained. As shown, a match generates an actuation signal to the flasher drive circuit 24 to actuate its operation and produce the flashing signals from the flasher 26 which is visible from the exterior of the building. As also seen, a crystal timer circuit 28 provides timing signals to the microcontroller 16 so that the microcontroller 16 can determine when the information received from the detector 14 represents a completed digit and store that data in the RAM 20.

The system also includes a manual reset switch 30 which has a momentary switch position to effect resetting of the microcontroller 16, i.e., placing the microcontroller 16 in an initial start up condition by dumping the RAM 20 and sending an "off" signal to the flasher drive circuit 24.

In the illustrated embodiment, a battery 32 provides its output directly to the flasher drive circuit 24. In addition, it supplies regulated power to the microcontroller 16 for its operations. The interface circuit 10 and the "on" hook/"off" hook and dialing detector 14 normally derive power directly from the telephone circuit.

Figure 2:
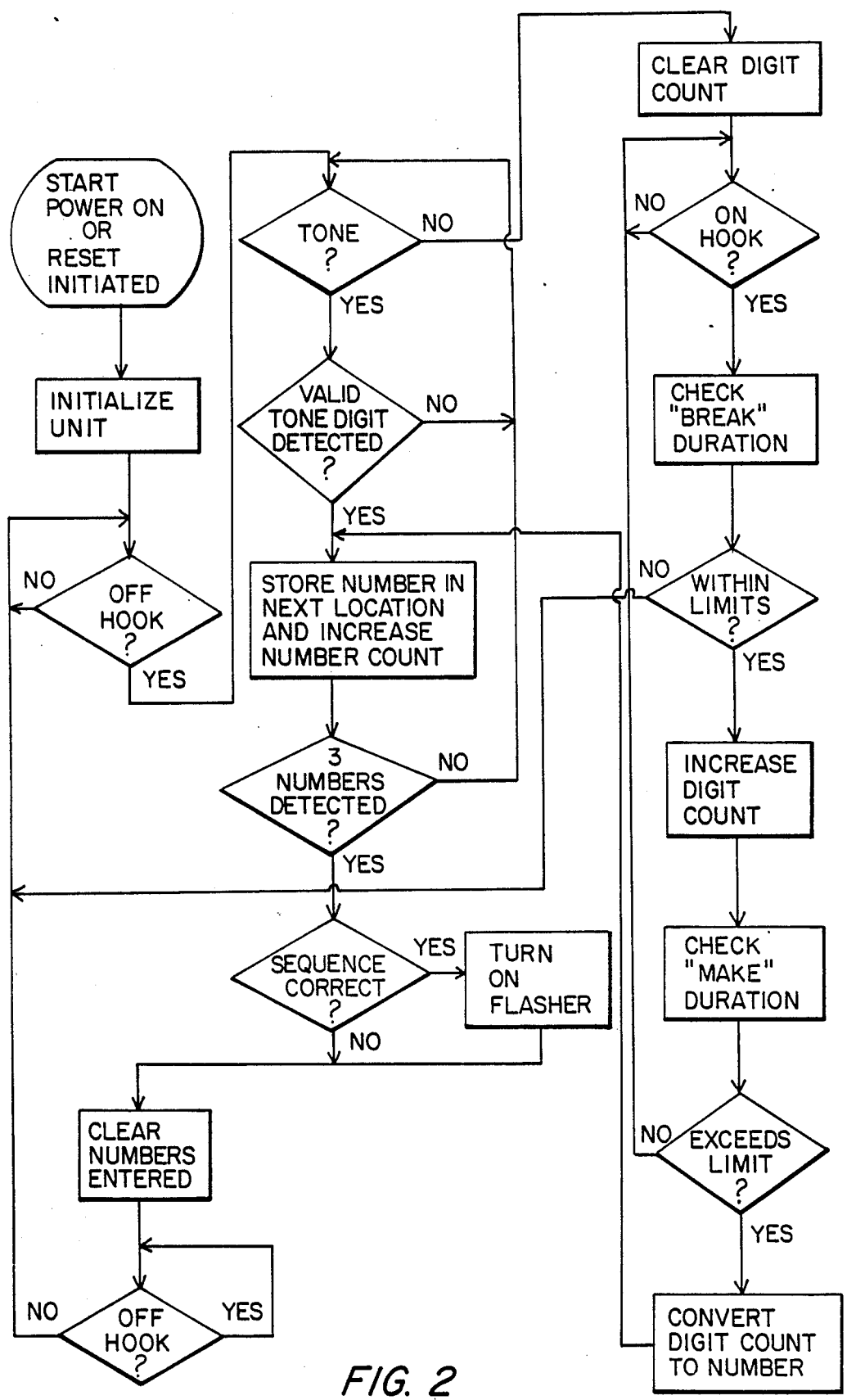
FIG. 2 is a flow chart of the functions performed in the device.

Turning now to FIG. 2, upon detection of an "off" hook condition by the detector 14, the microcontroller 16 is turned "on" and it is initialized. Upon detection of this "off" hook condition, the microcontroller 16 receives information from the decoder 18 and analyzes it to determine whether it is a dual tone multifrequency signal or a dial pulse signal. If a tone signal, the microcontroller 16 determines whether the appropriate tone digit has been detected, and, if so, the number detected is stored in one of three registers in the RAM 20. It then proceeds to determine the next two digits dialed until three digits have been stored in the registers of the RAM 20.

Upon storing the three digit sequence in RAM 20, the program in the PROM 22 evaluates the sequence of digits stored in the registers of the RAM 20 to determine whether they are the same as the predetermined emergency number sequence. If so, the microcontroller 16 determines that the emergency number has been dialed, and a signal is sent to the flasher drive circuit 24 to turn it on and the flasher 26 commences operation.

If the sequence is not the correct sequence, or after the actuation signal to the flasher drive circuit 24 has been generated, the numbers in RAM 20 are cleared to enable further input to the microcontroller 16.

If the microcontroller 16 has determined that the decoder 18 is receiving a digital dial pulse rather than tones, it will then monitor the dial pulses and the timing between pulses to check the break time between pulses and thus determine whether the pulses are part of a single digit being dialed. If the pulses are occurring within the limits for a single digit being dialed, the digit count will be increased by each pulse until the time limit exceeds that for a single digit being dialed, and the digit count will then be converted to a number which is stored in RAM 20. This procedure will be repeated until three digits have again been stored in the registers of the RAM 20. If the three digits are found to correspond to those for emergency actuation, the actuation signal is then generated and sent to the flasher drive circuit 24, and the system functions similarly.

In the preferred embodiment of the device, the program stored in the PROM 22 may also be used to detect initial sequences of three numbers For example, to permit testing of the system without calling the real emergency number, the numeral 119 represents a convenient test number which, when recognized, will cause operation of the flasher drive circuit 24. It is desirable to be able to reset the system without requiring manual resetting, and this is conveniently accomplished by storing in ROM 22 a sequence to effect automatic resetting such as the three digits 999.

In the illustrated embodiment, a battery 32 provides power directly to the flasher drive circuit 24 and provides power to the microcontroller 16 through the voltage regulator 34. As will be appreciated, the flasher will continue to operate until the system is reset or until the battery power has been exhausted.

Although the preferred apparatus employs a battery supply with its inherent limitations, this ensures operation of the system in the event of failure of line power, and the infrequent use of the device allows trickle charging of the battery. However, if so desired, line power can be utilized to power the drive element directly in addition to the battery power, or the battery power may provide for standby operation.

Although the system will monitor all outgoing telephone calls on the monitored line, the discrimination feature provided by monitoring and comparing only the first three digits will ensure against false actuation since the logic requires the actuating numbers to be the first three digits dialed. If this sequence is not obtained in the first three digits dialed, the monitoring device is disabled from further action even if the correct sequence of numbers should appear subsequently in the number being dialed.

The interface circuit can be placed in any convenient location within the building so long as the telephone line being monitored is available at that location. The interface circuit component, dialing detector and DTMF decoder are all standard components readily available and conventionally used in connection with telephone equipment. Any suitable microcontroller having a RAM, a PROM and suitable input and output ports can be utilized for the device. It can have either an internal or external timer associated therewith for the pulse discrimination.

The flasher drive circuit will contain a switch which is actuatable by an output signal from the microcontroller. If battery power is being used, an inverter will conventionally be employed to convert the DC power input to alternating current which is utilized to charge the capacitors for the repeated discharge to the strobe lamp of the flasher.

The battery voltage regulator will depend upon the power requirements of the microcontroller, and a regulator may also be required if the battery power is to be used for the DTMF decoder. The placement of the flasher within the structure will depend upon the direction from which monitoring is desired. In most apartments and homes, it is sufficient to place it in a window facing the street. However, it can be mounted on the exterior of the building although this exposes it to the elements. Multiple flashers may be employed provided that there is sufficient power to effect driving of the flasher units for a sufficient period of time to enable identification of the location by the emergency vehicles proceeding to the area.

Thus, it can be seen from the foregoing detailed description and drawings that the emergency telephone actuated signal light system of the present invention is one which may be fabricated readily from relatively long lived components at relatively low costs. It will accurately discriminate to determine when an emergency number is being dialed and actuate a signal light on the structure to help identification of the location. The device will monitor both dual tone multifrequency and digit pulse dialing telephones, and it may be provided with the capability for monitoring several different signals such as a reset sequence of numbers and a test sequence of numbers. Moreover, the digit information stored in the microcontroller may be varied to accommodate differences in emergency numbers in different communities.

What is claimed is:

1. An emergency signal light system actuated by dialing of an emergency telephone number and visible externally of the building in which the system is installed comprising:
    (a) an off hook detector;

(b) means for detecting the numbers being dialed on a standard telephone including means to detect dual tone multifrequency dialed numbers and means to detect pulse dialed numbers;

(c) microcontroller means for comparing the detected numbers from said detecting means with a stored emergency number and emitting an actuation signal upon detection of a match, said detecting means and microcontroller being operable to detect and evaluate both dual tone multifrequency and dial pulses of the numbers being dialed, said detecting means and microcontroller being rendered operational by said off hook detector upon detection of an off hook condition, and said microcontroller means including logic for discriminating between a stored number comprising a series of digits and a dialed number containing the stored number sequence as a part of a greater series of digits; and (d) light signal means discernible from the exterior of the building, said light signal means being actuated by an actuation signal from said microcontroller means.

2. The emergency signal light system in accordance with claim 1 wherein said light signal means is a flasher.

3. The emergency signal light system in accordance with claim 2 wherein said flasher is portable for placement in a window.

4. The emergency signal light system in accordance with claim 3 wherein said light signal means includes switch means actuatable by the actuation signal.

5. The emergency signal light system in accordance with claim 1 wherein there is included a battery power supply for components of said system.

6. In a method for generating an emergency light signal visible externally of a building upon dialing of an emergency telephone number, the steps comprising:

(a) placing a light at a location on a building visible externally to the street;

(b) providing a supply of power to operate said light;

(c) monitoring a standard telephone line to detect if the telephone is off hook;

(d) detecting the number being dialed by analyzing dual tone multifrequency telephone dialing signals and by relaying telephone dial pulses;

(e) providing the results of such analyzing and relaying to a microprocessor;

(f) comparing in said microprocessor a first group of numbers being dialed with a predetermined emergency number stored in memory of said microprocessor;

(g) emitting an actuation signal when the dialed numbers of the first group matches said emergency number, said actuation signal providing power to said light from said supply to effect its illumination; and (h) disabling said microprocessor from further processing of information concerning a dialed number if there is no match and until said microprocessor is reset.

7. The method for generating an emergency light signal in accordance with claim 6 wherein said step of providing a supply of power comprises connecting said light to a battery power source.

8. The method for generating an emergency light signal in accordance with claim 7 wherein said actuation signal causes said light to flash.

9. The method for generating an emergency light signal in accordance with claim 6 wherein said comparing step includes discriminating between a stored number comprising a series of digits and a dialed number containing the stored number sequence as a part of a greater series of digits.

* * * * *